United States Patent

Chaudhuri et al.

[11] Patent Number: 5,492,989
[45] Date of Patent: Feb. 20, 1996

[54] CHARGE IMBALANCED POLYELECTROLYTE COMPOSITION

[75] Inventors: Ratan K. Chaudhuri, Butler; Lowell R. Anderson, Morristown; Robert B. Login, Oakland, all of N.J.

[73] Assignee: ISP Investments Inc., Wilmington, Del.

[21] Appl. No.: 851,709

[22] Filed: Mar. 16, 1992

[51] Int. Cl.$^6$ ............................................. C08F 8/32
[52] U.S. Cl. ..................... 526/307.6; 526/310; 526/304; 526/307; 526/307.2; 526/307.5; 526/318.2; 525/327.6; 424/70.1
[58] Field of Search ............................ 525/327.6; 424/70; 526/307.6, 307, 307.5

[56] References Cited

U.S. PATENT DOCUMENTS

| | | | |
|---|---|---|---|
| 3,684,777 | 8/1972 | Field | 525/327.6 |
| 3,974,128 | 8/1976 | Block | 525/327.6 |
| 4,015,612 | 4/1977 | Pavlik | 525/327.6 |
| 4,985,487 | 1/1991 | Shih | 524/548 |

*Primary Examiner*—Fred Zitomer
*Attorney, Agent, or Firm*—Walter Katz; Marilyn J. Maue; Joshua J. Ward

[57] ABSTRACT

A charge imbalanced polymer comprising:

(a) about 10 to 90 mole % of polymeric units having the formulas

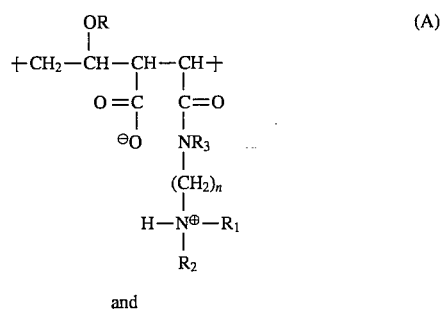

(A)

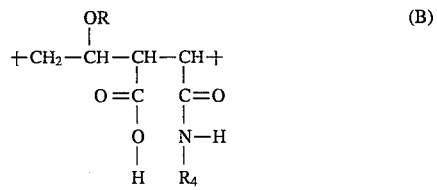

(B)

where A is present in an amount of about 0.1–0.8 mole, and B is present in an amount of about 0.05–0.4 mole, and where A is 2–6 times B, where R=$C_1$–$C_4$ alkyl,
n=1–6,
$R_1$ and $R_2$ are independently $C_1$–$C_6$ alkyl,
$R_3$ is H or lower alkyl, and
$R_4$=$C_{12}$–$C_{24}$ alkyl;

and (b) about 10 to 90 mole % of a polymeric diacid units having the formula:

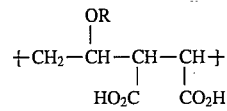

where R is as defined above, and (c) about 0–20 mole % of by-product salts which are the dialkylaminoalkylamine and alkylamine salts of acid units of (a) and (b).

The charged imbalanced polymer described above is made by:

reacting 1 mole of an anhydride compound having the formula

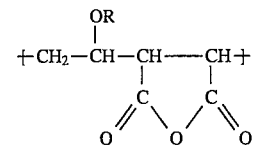

where R is as defined above,
with less than 1 mole of a mixture of about 0.1–0.8 mole of a compound having the formula

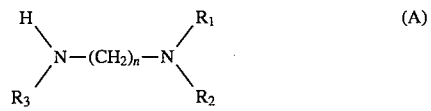

(A)

where n, $R_1$, $R_2$ and $R_3$ are as defined above, and about 0.05–0.4 of a compound having the formula

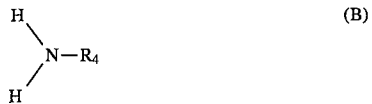

(B)

where $R_4$ is defined above, and where A is 2–6 times B, isolating the product, and
hydrolyzing any residual anhydride compound in water to the corresponding diacid compound.

9 Claims, No Drawings

CHARGE IMBALANCED POLYELECTROLYTE COMPOSITION

CROSS-REFERENCE TO RELATED PATENT APPLICATIONS

This application is related to copending U.S. patent application Ser. No. 796,996, filed Nov. 25, 1991.

BACKGROUND OF THE INVENTION

1. Field of the Invention

This invention relates to polymers useful in cosmetic, pharmaceutical and agricultural formulations, and more particularly, to charge imbalanced polymers useful in such applications.

2. Description of the Prior Art

Cosmetic formulations using maleic anhydride interpolymers and/or amphoteric polymers are described in U.S. Pat. Nos. 3,974,128; 3,684,776; and 4,985,487. However, it is desired to provide new and improved polymers which can find particular application in shampoo, hair fixative and conditioner products as dispersive agents and viscosity enhancers.

SUMMARY OF THE INVENTION

What is provided herein is a charge imbalanced polymer comprising:

(a) about 10 to 90 mole % of polymeric units having the formulas

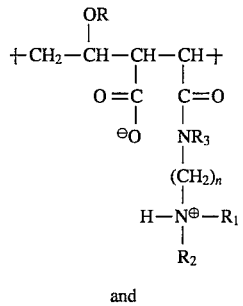
(A)

and

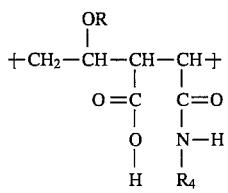
(B)

where A is present in an amount of 0.1–0.8 mole and B is present in an amount of about 0.05–0.4 mole, where A is 2–6 times B, where $R = C_1-C_4$ alkyl, $n = 1-6$, $R_1$ and $R_2$ are independently $C_1-C_6$ alkyl, $R_3$ is H or lower alkyl, and $R_4 = C_{12}-C_{24}$ alkyl, and (b) about 10 to 90 mole % of a polymeric diacid units having the formula:

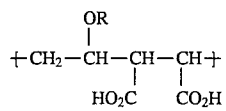

where R is as defined above, and (c) about 0–20 mole % of by-product salts which are the dialkylaminoalkylamine and alkylamine salts of acid units of (a) and (b).

The polymer described above is made by:

reacting 1 mole of an anhydride compound having the formula

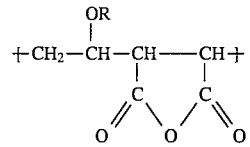

where R is as defined above, with less than 1 mole of a mixture of about 0.1–0.8 mole of a compound having the formula

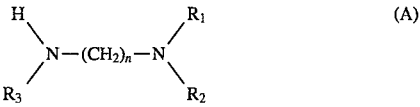
(A)

where n, $R_1$, $R_2$ and $R_3$ are as defined above, and about 0.05–0.4 mole of a compound having the formula

(B)

where $R_4$ is as defined above, and where A is 2–6 times B, (b) isolating the product, and (c) hydrolyzing any residual anhydride compound in water to the corresponding diacid compound.

The polymers of the invention are particularly useful as water-soluble adhesives, viscosity enhancers, dispersing agents, and, in particular, in application in cosmetic preparations such as shampoo and hair conditioner products.

DETAILED DESCRIPTION OF THE INVENTION

The starting copolymers in accordance with the invention are made by copolymerizing an alkyl vinyl ether, e.g. a $C_1-C_6$ alkyl vinyl ether, such as a methyl, ethyl, butyl, etc. vinyl ether; and maleic anhydride, to produce copolymers of varying molecular weights. These copolymers are available commercially from ISP under the tradename of Gantrez® AN, e.g. AN-169, 149, 139 and 119.

These copolymers then are reacted with less than a stoichometric amount of a mixture of about 0.1–0.8 mole, preferably about 0.4–0.6 mole, of an N,N-dialkylaminoalkylamine, such as N,N-dimethylaminoethylamine or N,N-dimethylaminopropylamine, and about 0.05–0.6, preferably about 0.1–0.2 mole of a long chain amine, such as dodecylamine and octadecylamine, and most preferably, wherein the former is present in an amount which is about 2–6 times the latter.

EXAMPLE 1

Preparation of Polymer of Invention

A 2-liter, four-necked round bottom flask equipped with thermometer, condenser, dropping funnel and a mechanical stirrer was charged with Gantrez® AN-119* which is a maleic anhydride-methyl vinyl ether copolymer (78.08 g., 0.5 mole repeating unit), acetone (150 ml) and ethyl acetate (500 ml) and heated to reflux. Then N,N-dimethylaminoethyl amine (30.65 g., 0.3 mole) and octadecylamine (13.5 g., 0.5 mole) were slowly added during 30 minutes. The solution was stirred while refluxing at 57° C. for 3 hours. The precipitate was filtered, washed with acetone and dried in a vacuum oven at 60° C. for 7 hours. The yield was 95%.

*ISP (Wayne, N.J.)

EXAMPLE 2

A 2-liter, round bottom, 4-neck flask equipped with an overhead stirrer, condenser, thermocouple (with controller), and dropping funnel/nitrogen inlet system was charged with the following:

Gantrez® AN-119=312 g. (2 moles)
Heptane=1500 ml.

The mixture was stirred and heated to 50° C.; then 61.2 g. (0.6 moles) of dimethylaminopropylamine and 53.8 g. (0.2 mole) of octadecylamine were added by separate dropping funnels over a period of 20 minutes. The reaction was then maintained at 50° C. for a period of 6 hours. After this time the white slurry was filtered to recover the solid product which was then placed in an unheated vacuum oven to dry under vacuum. This produced the anhydride form of the product.

The dry solid from the reaction above was hydrolyzed with water to convert the product to the acid form. This was done by combining 192.0 grams with 800 grams of water in a 2-liter round bottom flask equipped with an overhead stirrer, thermocouple (with controller), condenser and nitrogen inlet. The mixture was stirred and heated to 50° C. and maintained at that temperature for 6 hours. The temperature was then allowed to return to room temperature but the stirring was continued overnight. The resultant whitish slurry was then analyzed for percent solids. Results: 21.11%; expected: 19.4%.

EXAMPLE 3

A 2-liter, round bottom, 4-neck flask equipped with an overhead stirrer, condenser, thermocouple, (with controller), and dropping funnel/nitrogen inlet system was charged with the following:

Gantrez® AN-119=312 g. (2 moles)
Methyl t-Butyl Ether=1250 ml.

The mixture was stirred and heated to reflux at 55° C. A solution of 81.6 g. (0.8 moles) of dimethylaminopropylamine in 250 ml. of methyl t-butyl ether and 107.6 g. (0.4 mole) of octadecylamine was then dropped in over a period of 30 minutes.

Finally, the reaction was maintained at reflux for 6 hours and then filtered. The white, solid product was then dried under vacuum overnight to remove solvent.

EXAMPLE 4

A reaction was carried out in the same manner as in Example 3 except that the addition of dimethylaminopropylamine was 40.8 g. (0.4 mole).

EXAMPLE 5

The reaction was the same as in Example 4 except that 20.4 g. of dimethylaminopropylamine was used to produce the product.

EXAMPLE 6

The procedure of Example 3 is followed except that Gantrez® AN-169, AN-139 and AN-149 are used in place of Gantrez® AN-119, with similar results.

It is to be understood that the above examples are provided to illustrate specific and preferred embodiments of the invention and that many modifications and alterations can be made in these examples without departing from the scope of the invention.

What is claimed is:

1. A charge imbalanced polymer comprising:
   (a) about 10 to 90 mole % of polymeric units having the formulas

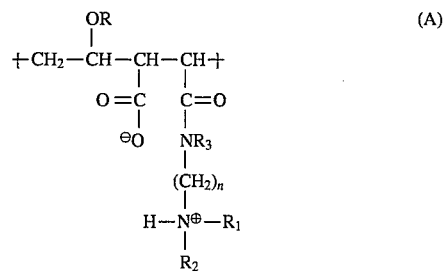

(A)

and

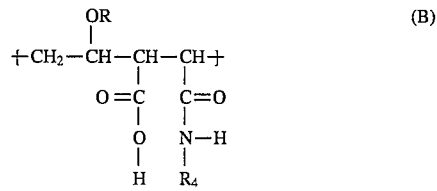

(B)

where $R=C_1-C_4$ alkyl,
$n=1-6$,
$R_1$ and $R_2$ are independently $C_1-C_6$ alkyl,
$R_3$ is H or lower alkyl, and
$R_4=C_{12}-C_{24}$ alkyl,
where A is present in an amount of about 0.1–0.8 mole, and B of about 0.05–0.4 mole, in said mixture, and A is about 2-6 times B, and,
   (b) about 10 to 90 mole % of a polymeric diacid units having the formula:

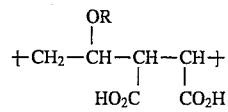

where R is as defined above, and, optionally including therein,
   (c) about 0–20 mole % of the dialkylaminoalkylamine and alkylamine salts of acid units of (a) and (b).

2. A charge imbalanced polymer according to claim 1 wherein (c) is present in an amount of less than 3 mole %.

3. A polymer according to claim 1 wherein n is 3 and $R_1$ and $R_2$ are both methyl.

4. A polymer according to claim 1 comprising:
   (a) 30 to 70 mole %, and
   (b) 30 to 70 mole %.

5. A polymer according to claim 1 where R is methyl.
6. A polymer according to claim 1 where $R_3$ is H.
7. A polymer according to claim 1 where $R_4$ is $C_{18}$ alkyl.
8. A polymer according to claim 1 where A is about 0.4–0.6 mole and B about 0.1–0.2 in said mixture.
9. An aqueous solution of the polymer according to claim 1.

* * * * *